(12) United States Patent
Guan

(10) Patent No.: US 9,817,460 B2
(45) Date of Patent: Nov. 14, 2017

(54) TESTING METHOD FOR A SMART WRISTBAND AND TESTING SYSTEM THEREOF

(71) Applicant: HUIZHOU TCL MOBILE COMMUNICATION CO., LTD., Huizhou, Guangdong (CN)

(72) Inventor: Yin Guan, Huizhou (CN)

(73) Assignee: HUIZHOU TCL MOBILE COMMUNICATION CO., LTD., Huizhou (CN)

( * ) Notice: Subject to any disclaimer, the term of this patent is extended or adjusted under 35 U.S.C. 154(b) by 215 days.

(21) Appl. No.: 14/442,262

(22) PCT Filed: May 23, 2014

(86) PCT No.: PCT/CN2014/078254
§ 371 (c)(1),
(2) Date: May 12, 2015

(87) PCT Pub. No.: WO2015/139368
PCT Pub. Date: Sep. 24, 2015

(65) Prior Publication Data
US 2016/0274635 A1 Sep. 22, 2016

(30) Foreign Application Priority Data
Mar. 20, 2014 (CN) .......................... 2014 1 0105696

(51) Int. Cl.
*G06F 1/28* (2006.01)
*G06F 1/16* (2006.01)
(Continued)

(52) U.S. Cl.
CPC ................ *G06F 1/28* (2013.01); *G06F 1/163* (2013.01); *G06F 1/3296* (2013.01);
(Continued)

(58) Field of Classification Search
CPC ............. G06F 11/3034; G06F 11/3055; G06F 11/3664; G06F 11/008; G06F 9/44521;
(Continued)

(56) References Cited

U.S. PATENT DOCUMENTS 6,718,284 B2 * 4/2004 Smith .................. G01R 31/021
324/500
2005/0206555 A1 * 9/2005 Bridgelall ................. G01S 5/14
342/127
(Continued)

FOREIGN PATENT DOCUMENTS

CN 101635599 A 1/2010
CN 101635599 A 1/2010
(Continued)

OTHER PUBLICATIONS

English Abstract of CN 101635599 A.
(Continued)

*Primary Examiner* — Nadeem Iqbal

(57) ABSTRACT

A testing method for a smart wristband and a testing system thereof are provided. The Bluetooth function of the smart wristband is put into a sleep state through presetting of the system software before the test, and the testing method comprises the following steps of: carrying out electrical connection operations on the smart wristband under test during the test so that the Bluetooth function of the smart wristband is activated; completing pairing between the smart wristband and the testing apparatus, and synchronously displaying a corresponding function of the smart wristband on a screen of the testing apparatus so as to be tested, wherein the testing apparatus is a smartphone, and the testing of the corresponding function includes at least one of Bluetooth power testing, writing of the mainboard serial number, charging testing and motor vibration controlling.

19 Claims, 3 Drawing Sheets

(51) Int. Cl.
*G06F 1/32* (2006.01)
*H04W 4/00* (2009.01)
*H04M 1/24* (2006.01)
*H04M 1/725* (2006.01)

(52) U.S. Cl.
CPC .............. *H04W 4/008* (2013.01); *H04M 1/24* (2013.01); *H04M 1/7253* (2013.01); *H04M 2250/02* (2013.01)

(58) Field of Classification Search
CPC .. G06F 9/5061; G06F 9/4411; G06F 9/44505; G01R 31/007; G01R 31/3627; G01R 31/041
See application file for complete search history.

(56) References Cited

U.S. PATENT DOCUMENTS

| | | | |
|---|---|---|---|
| 2009/0207013 A1* | 8/2009 | Ayed | G08B 13/1427 340/539.1 |
| 2010/0238977 A1 | 9/2010 | Bulled et al. | |
| 2010/0302972 A1 | 12/2010 | Wu et al. | |
| 2012/0300649 A1* | 11/2012 | Parmar | H04L 43/0888 370/252 |
| 2014/0037104 A1* | 2/2014 | Seo | H04R 3/00 381/77 |
| 2014/0049883 A1* | 2/2014 | Kim | H02P 31/00 361/679.01 |
| 2015/0093987 A1* | 4/2015 | Ouyang | H04B 5/0043 455/41.1 |
| 2015/0312862 A1 | 10/2015 | Pei | |
| 2016/0191358 A1* | 6/2016 | Guan | H04W 4/008 370/252 |

FOREIGN PATENT DOCUMENTS

| | | |
|---|---|---|
| CN | 102243281 A | 11/2011 |
| CN | 102438055 A | 5/2012 |
| CN | 103595854 A | 2/2014 |
| CN | 103595854 A | 2/2014 |

OTHER PUBLICATIONS

English Abstract of CN 103595854 A.
English Abstract of CN 102243281 A.
English translation of CN102438055.

* cited by examiner

TESTING METHOD FOR A SMART WRISTBAND AND TESTING SYSTEM THEREOF

RELATED APPLICATION

This application is a national phase entry under 35 USC 371 of International Patent Application No PCT/CN2014/078254 filed 23 May 2014, which claims priority from Chinese Patent Application No. 2014101056964 filed on 20 Mar. 2013, the disclosures of which are incorporated in their entirety reference herein.

FIELD OF THE INVENTION

The present disclosure relates to the technical field of terminal testing, and more particularly, to a testing method for a smart wristband and a testing system thereof.

BACKGROUND OF THE INVENTION

As a new generation of wearable smart mobile terminals, smart wristbands have gradually become great favorites in the global consumer electronics market following the smartphones and the tablet computers. Therefore, testing of various functions of the smart wristbands becomes essential.

Currently, tests of the mobile terminals or the smart terminals all rely on use of personal computers (PCs) as testing apparatuses. In other words, the tests mainly rely on use of a testing program developed and compiled on PCs to control the smart wristbands under test and corresponding testing systems or instruments to accomplish the tests. However, because the operation system (Windows) of the PCs is relatively complex, the testing program used in the tests is also relatively complex. That is, the testing method based on the PCs has high requirements for the testing scene, and is inconvenient to operate and has poor transportability.

SUMMARY OF THE INVENTION

Accordingly, the technical problem to be solved by the present invention is to provide a testing method for a smart wristband and a testing system thereof, which have low requirements for the testing scene, are convenient to operate, and have good transportability and low cost.

To solve the aforesaid technical problem, one technical solution adopted by the present disclosure is to provide a testing method for a smart wristband, the Bluetooth function of the smart wristband is put into a sleep state through presetting of the system software before the test, and the testing method comprises the following steps of: carrying out electrical connection operations on the smart wristband under test during the test so that the Bluetooth function of the smart wristband is activated, wherein the smart wristband under test is electrically connected to a testing apparatus during the test and is electrically disconnected from the testing apparatus after the Bluetooth function is activated; and completing pairing between the smart wristband and the testing apparatus, and displaying a corresponding function of the smart wristband on a screen of the testing apparatus so as to be tested, wherein the testing apparatus is a smartphone, the testing of the corresponding function includes at least one of Bluetooth power testing, writing of the mainboard serial number, charging testing and motor vibration controlling, and wherein the smartphone accomplishes writing of the mainboard serial number of the smart wristband through scanning with a camera of the smartphone, and positions of the smartphone and the smart wristband relative to each other remain unchanged during the Bluetooth power testing.

In one embodiment, the testing method further comprises the following step before the step of carrying out electrical, connection operations on the smart wristband under test: completing self-testing by the smart wristband automatically through the use of the system software, wherein the self-testing includes LED testing and sensor testing.

In one embodiment, the testing method further comprises the following steps of: setting the corresponding function to correspond to a first flag bit before the test; and if the test passes, then setting the corresponding function to correspond to a second flag bit, and generating test information according to the second flag bit and uploading the test information to the smartphone.

In one embodiment, the smart wristband is provided with a reset button, and the testing method further comprises the following step of: if the smart wristband runs out of power during the test, then charging the smart wristband and, meanwhile, long-pressing the reset button to put the Bluetooth function of the smart wristband into the sleep state again.

To solve the aforesaid technical problem, another technical solution adopted by the present disclosure is to provide a testing method for a smart wristband, the Bluetooth function of the smart wristband is put into a sleep state through presetting of the system software before the test, and the testing method comprises the following steps of: carrying out electrical connection operations on the smart wristband under test during the test so that the Bluetooth function of the smart wristband is activated; and completing pairing between the smart wristband and the testing apparatus, and synchronously displaying a corresponding function of the smart wristband on a screen of the testing apparatus so as to be tested, wherein the testing apparatus is a smartphone, the testing of the corresponding function includes at least, one of Bluetooth power testing, writing of the mainboard serial number, charging testing and motor vibration controlling.

In one embodiment, the testing method further comprises the following step before the step of carrying out electrical connection operations on the smart wristband under test: completing self-testing by the smart wristband automatically through the use of the system software, wherein the self-testing includes LED testing and sensor testing.

In one embodiment, the smartphone accomplishes writing of the mainboard serial number of the smart wristband through scanning with a camera of the smartphone, and positions of the smartphone and the smart wristband relative to each other remain unchanged during the Bluetooth power testing.

In one embodiment, the testing method further comprises the following steps of: setting the corresponding function to correspond to a first flag bit before the test; and if the test passes, then setting the corresponding function to correspond to a second flag bit, and generating test information according to the second flag bit and uploading the test information to the smartphone.

In one embodiment, the step of carrying out electrical connection operations on the smart wristband under test during the test comprises the following step of: electrically connecting the smart wristband under test to the testing apparatus during the test, and electrically disconnecting the smart wristband from the testing apparatus after the Bluetooth function is activated.

In one embodiment, the smart wristband is provided with a reset button, and the testing method further comprises the following step of: if the smart wristband runs out of power during the test, then charging the smart wristband and, meanwhile, long-pressing the reset button to put the Bluetooth function of the smart wristband into the sleep state again.

To solve the aforesaid technical problem, one technical solution adopted by the present disclosure is to provide a testing system for a smart wristband, and the testing system comprises a shielding box as well as a positioning mechanism, power pins and a testing apparatus disposed within the shielding box, wherein: the positioning mechanism is adapted to fix the testing apparatus and the smart wristband under test to specified positions in the shielding box before the test, the Bluetooth function of the smart wristband is put into a sleep state through presetting of the system software, and the testing apparatus is a smartphone; the power pins are adapted to carry out electrical connection operations on the smart wristband under test during the test so that the Bluetooth function of the smart wristband is activated to complete pairing between the smart wristband and the testing apparatus and a corresponding function of the smart wristband is synchronously displayed on a screen of the testing apparatus so as to be tested, wherein the testing of the corresponding function includes at least one of Bluetooth power testing, writing of the mainboard serial number, charging testing and motor vibration controlling.

In one embodiment, the power pins are adapted to electrically connect the smart wristband under test to the testing apparatus during the test and electrically disconnect the smart wristband from the testing apparatus after the Bluetooth function is activated.

In one embodiment, the testing system further comprises a loud speaker and an earphone jack, wherein the loud speaker is adapted to play a ringtone for prompting that the pairing has been completed, and the earphone jack is adapted to receive in an earphone so that the prompting ringtone is played via the earphone to prompt that the pairing has been completed.

In one embodiment, the smart wristband is provided with a reset button, which is adapted to put the Bluetooth function of the smart wristband into the sleep state again through long-pressing of the reset button if the smart waistband runs out of power during the test and is being charged.

As compared to the prior art, the present disclosure has the following benefits: the Bluetooth function of the smart wristband is put into a sleep state through presetting of the system software before the test; electrical connection operations are carried out on the smart wristband under test during the test so that the Bluetooth function of the smart wristband is activated; after pairing between the smart wristband and the testing apparatus is completed, a corresponding function of the smart wristband is synchronously displayed on a screen of the testing apparatus so as to be tested. Because the present disclosure adopts the smartphone which has a simple operation system as a testing apparatus to test the smart wristband, the testing program used in the tests is also relatively simple. This lowers the requirements for the testing scene, makes operations convenient, and has good transportability and low cost.

DETAILED DESCRIPTION OF THE INVENTION

To make the objectives, technical solutions and technical effects of the present disclosure clearer, a detailed description will be further made on embodiments of the present disclosure with reference to the attach drawings.

Figure 1:
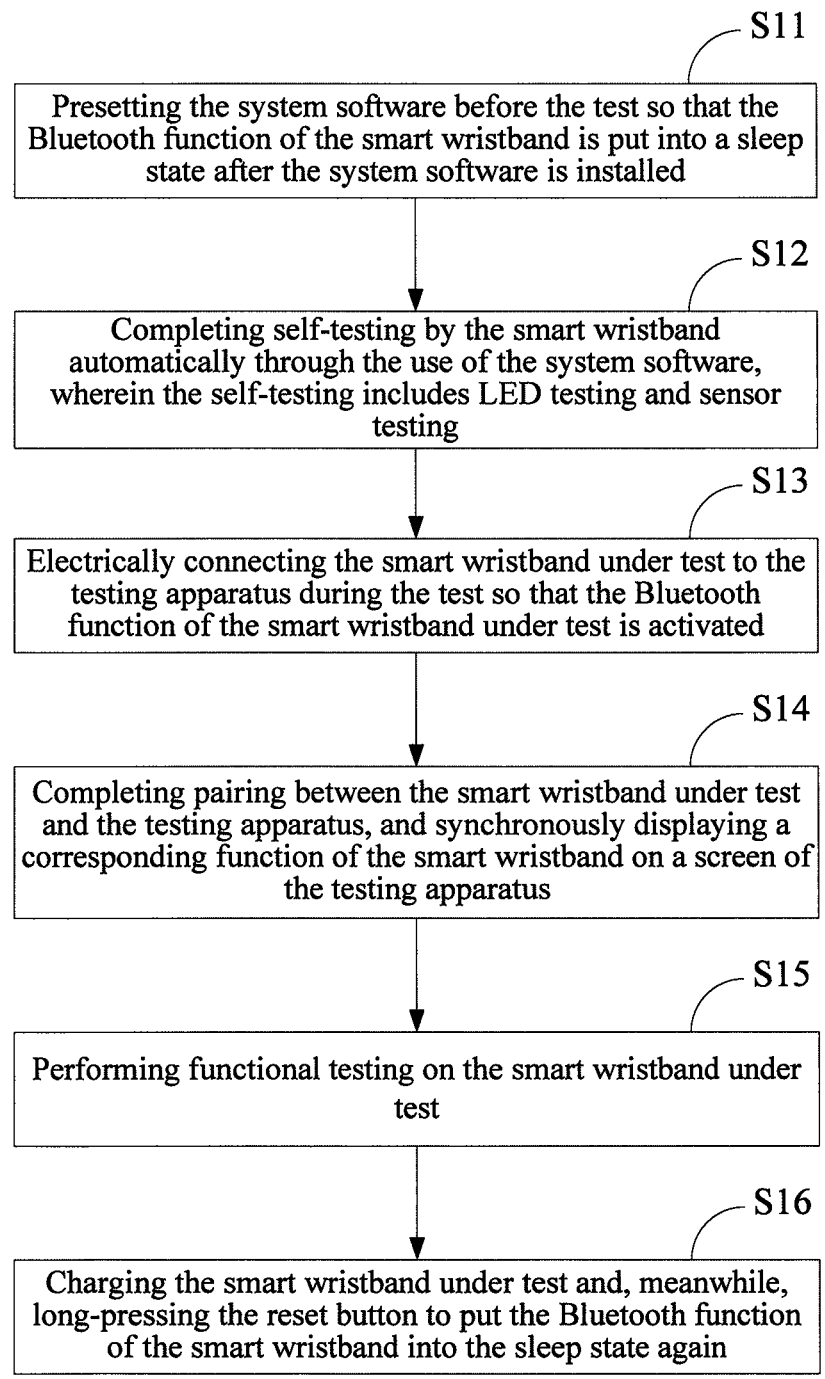
FIG. 1 is a flowchart diagram of a test method for a smart wristband according to a preferred embodiment of the present disclosure.
Figure 2:
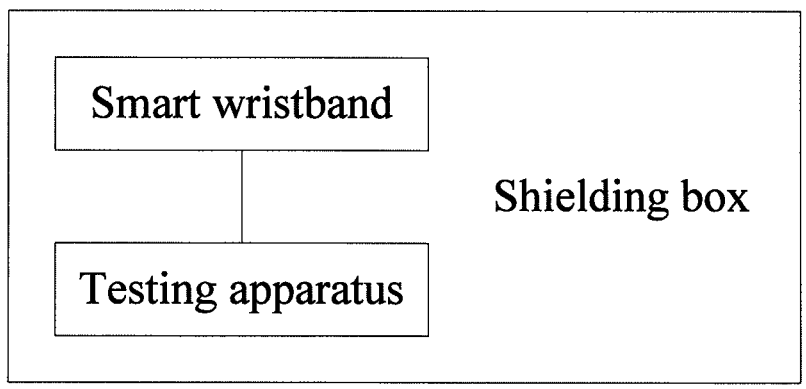
FIG. 2 is a block diagram illustrating of relationship of a smart wristband, a testing apparatus and a shielding box according to an embodiment of the present disclosure.
Figure 3:
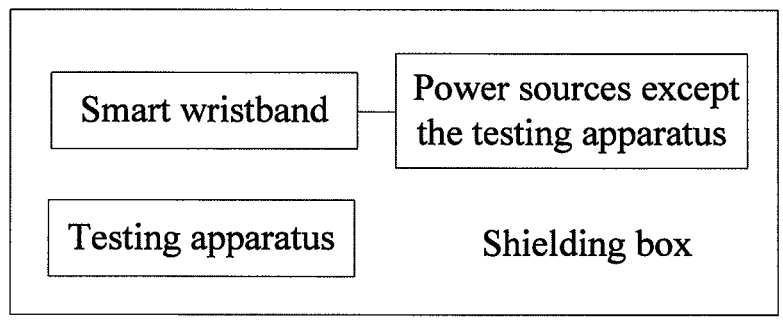
FIG. 3 is a block diagram illustrating of relationship of a smart wristband, a testing apparatus, a shielding box and a power sources except the testing apparatus according to another embodiment of the present disclosure.

FIG. 1 is a flowchart diagram of a test method for a smart wristband according to a preferred embodiment of the present disclosure. FIG. 2 is a block diagram illustrating of relationship of a smart wristband, a testing apparatus and a shielding box according to an embodiment of the present disclosure. FIG. 3 is a block diagram illustrating of relationship of a smart wristband, a testing apparatus, a shielding box and a power sources except the testing apparatus according to another embodiment of the present disclosure. The testing method of the present disclosure is based on a testing system of the smart wristband, and the testing system comprises a shielding box as well as a positioning mechanism and power pins disposed within the shielding box. The shielding box is adapted to confine a testing environment to ensure that the testing will not be interfered by other testing signals. The positioning mechanism is adapted to fix the texting apparatus and the smart wristband under test to specified positions in the shielding box before the test so as to ensure that positions of the testing apparatus and the smart wristband under text relative to each other remain fixed during the testing. The power pins are adapted to carry out electrical connection operations on the smart wristband during the test so that the Bluetooth function of the smart wristband is activated. It shall be understood that, the testing system of the smart wristband disclosed in the present disclosure may also be implemented in other ways.

Bluetooth is the only communication interface means of the smart wristband of the present disclosure, and all the functional tests on the smart wristband are based on a Bluetooth connection created between the smart wristband and the testing apparatus. The testing apparatus mentioned throughout the present disclosure is and can only be a smartphone.

Referring to the FIGURE, the testing method for the smart wristband of this embodiment comprises the following steps of:

Step S11: presetting the system software before the test so that the Bluetooth function of the smart wristband is put into a sleep state after the system software is installed.

For the smart wristband, in designing of the system software that is to be installed and operated on the smart wristband, the system software is programmed to ensure that, once being downloaded or installed, the system software automatically controls the smart wristband to put the Bluetooth function of the smart wristband into a sleep state (i.e., deactivated).

Similarly, for the smart wristband, an ROM (Read Only Memory) of the smart wristband is empty before the system software is downloaded, and once it is detected that the ROM is not empty (i.e., the system software has been downloaded or installed), the smart wristband automatically deactivates the Bluetooth function, i.e., puts the Bluetooth function thereof into a sleep state.

In one embodiment, flag bits are set in the smart wristband (the smartphone) through the use of system software before the test so as to identify whether the function being tested passes the test, where a first flag bit represents that a corresponding functional testing does not pass, and a second flag bit represents that a corresponding functional testing passes. Based on the fact that the testing of the function includes at least one of LED testing, sensor testing, Bluetooth power testing, writing of the mainboard serial number, charging testing and motor vibration controlling, the first flag bits and the second flag bits corresponding to various functional tests may be set to be the same as each other or different from each other in this embodiment. For example, the first flag bits corresponding to the various functional tests are set to be the same value of 0, and the second flag bits are set to be the same value of 1. It shall be appreciated that, the first flag bit and the second flag bit may also be expressed as corresponding labels (e.g., TRUE and FALSE) rather than specific values.

Further in one embodiment, flag bits are set in the smart wristband (the smartphone) through the use of system software before the test so as to identify whether the pairing between the smart wristband and the testing apparatus has been completed in subsequent testing, where a third flag bit represents that the pairing therebetween is not completed or fails, and a fourth flag bit represents that the pairing therebetween has been completed. Typically, the third flag bit is set to be 0 and the fourth flag bit is set to be 1 in this embodiment. Then, the smart wristband has the third flag bit 0 set therein and the testing apparatus has the fourth flag bit 1 set therein by default before the test. It shall be appreciated that, the third flag bit and the fourth flag bit may also be expressed as corresponding labels (e.g., TRUE and FALSE) rather than specific values. Moreover, the third flag bit and the fourth flag bit are not correlated with the first flag bit and the second flag bit, but the values (labels) of the third flag bit and the first flag bit may be the same as each other or different from each other, and the values (labels) of the fourth flag bit and the second flag bit may be the same as each other or different from each other.

Step S12: completing self-testing by the smart wristband automatically through the use of the system software, wherein the self-testing includes LED testing and sensor testing.

Functional testing performed on the mobile wristband by the present disclosure is divided into a PCBA (Printed Circuit Board+Assembly) testing phase and an assembled machine testing phase. The LED testing and the sensor testing in this step both belong to the PCBA testing phase which mainly detects whether the circuit board of the smart wristband is qualified.

Step S13: electrically connecting the smart wristband under test to the testing apparatus during the test so that the Bluetooth function of the smart wristband under test is activated.

After the smart wristband under test and the testing apparatus have been fixed by the positioning mechanism to specified positions in the shielding box, electrical connection operations can be carried out on the smart wristband under test via the power pins to activate the Bluetooth function of the smart wristband and keep the Bluetooth function of the smart wristband being activated during the whole testing process. Then, the electrical connection between the smart wristband and the testing apparatus via the power pins is disconnected.

The power pins electrically connect the smart wristband under test to the testing apparatus during the test in this embodiment. Of course, the power pins may electrically connect the smart wristband to other power sources in other embodiments, and no limitation is made thereto in the present disclosure.

Step S14: completing pairing between the smart wristband under test and the testing apparatus, and synchronously displaying a corresponding function of the smart wristband on a screen of the testing apparatus.

After the Bluetooth function of the smart wristband under test is activated, the Bluetooth function of the testing apparatus is also activated. In the shielding box, only the smart wristband under test and the testing apparatus have the Bluetooth function, so it can be ensured that the specified smart wristband under test and the test apparatus are connected in one-to-one correspondence via Bluetooth during the test.

After the pairing is established, operations of corresponding functions of the smart wristband are synchronously displayed on the screen of the testing apparatus, and the testing personnel can test the functions of the smart wristband on the screen of the smartphone.

Additionally, in terms of the flag bit that is set in the step S11 to identify whether the pairing between the smart wristband and the testing apparatus is completed, the third flag bit 0 in the smart wristband is changed into the fourth flag bit 1 when the pairing is completed in this step S14, and this is typically displayed to the testing personnel via the screen of the testing apparatus so that the testing personnel can click on the testing apparatus to confirm that the pairing between the testing apparatus and the smart wristband has been completed.

Typically, the testing method of this embodiment further comprises step S14: playing a ringtone for prompting that the pairing has been completed. Specifically, the testing system on which the testing method is based further comprises a loud speaker and an earphone jack, wherein the loud speaker is adapted to play a ringtone for prompting the testing personnel that the pairing has been completed, and the earphone jack is adapted to receive in an earphone so that the prompting ringtone is played via the earphone to prompt the testing personnel that the pairing has been completed and the subsequent functional testing can be performed.

Step S15: performing functional testing on the smart wristband under test. Data instructions are transmitted via the Bluetooth connection between the testing apparatus and the smart wristband to perform functional testing that includes at least one of Bluetooth power testing, writing of the mainboard serial number, charging testing and motor vibration controlling.

In this embodiment, the smartphone accomplishes writing of the mainboard serial number of the smart wristband through scanning with a camera of the smartphone, and positions of the smartphone and the smart wristband relative to each other remain unchanged by the positioning mechanism during the Bluetooth power testing.

Additionally, in terms of the flag bit that is set in the step S11 to identify whether the function of the smart wristband being tested passes the test, the first flag bit 0 corresponding to a certain function of the smart wristband is changed into the second flag bit 1 when the function passes the test in this step S15, and this is typically displayed to the testing personnel via the screen of the testing apparatus to inform the testing personnel in time. Meanwhile, the smartphone generates test information according to the second flag bit 1 and uploads and stores the test information into the system of the smartphone for subsequent analysis and reference, and this makes the testing method of the present disclosure traceable.

In consideration of cases where the smart wristband suffers from a crash fault or has a low power level or even runs out of power during the functional testing, the smart wristband may be provided with a reset button. In this case, the testing method of the present disclosure further comprises step S16: charging the smart wristband under test and, meanwhile, long-pressing the reset button to put the Bluetooth function of the smart wristband into the sleep state again. This step is mainly used to ensure that the smart wristband will not, establish a Bluetooth connection with other terminals when the smart wristband is taken out of the shielding box and is being charged. Later, the aforesaid step S12 can be executed to continue the test.

According to the above descriptions, the Bluetooth function of the smart wristband is put into a sleep state through presetting of the system software before the test; electrical connection operations are carried out on the smart wristband under test during the test so that the Bluetooth function of the smart wristband is activated; after pairing between the smart wristband and the testing apparatus is completed, a corresponding function of the smart wristband is synchronously displayed on a screen of the testing apparatus so as to be tested. Because the present disclosure adopts the smartphone which has a simple operation system as a testing apparatus to test the smart wristband, the testing program used in the tests is also relatively simple. This lowers the requirements for the testing scene, makes operations convenient, and has good transportability and low cost.

What described above are only the embodiments of the present disclosure, but are not intended to limit the scope of the present disclosure. Any equivalent structures or equivalent process flow modifications that are made according to the specification and the attached drawings of the present disclosure, or any direct or indirect applications of the present disclosure in other related technical fields shall all be covered within the scope of the present disclosure.

What is claimed is:

1. A testing method for a smart wristband, comprising the following steps of:
   presetting system software to put Bluetooth function of the smart wristband into a sleep state before test;
   electrically connecting the smart wristband when starting the test so that the Bluetooth function of the smart wristband is activated, and electrically disconnecting the smart wristband after the Bluetooth function is activated; and
   completing pairing connection between the smart wristband and a testing apparatus, and synchronously displaying functions of the smart wristband on a screen of the testing apparatus, wherein the testing apparatus is a smartphone, the testing of the functions comprises at least one of Bluetooth power testing, writing of mainboard serial number, charging testing and motor vibration controlling, and wherein the writing of the mainboard serial number of the smart wristband is accomplished through scanning with a camera of the smartphone, and positions of the smartphone and the smart wristband relative to each other remain unchanged during the Bluetooth power testing.

2. The testing method of claim 1, further comprising the following step before the step of electrically connecting the smart wristband when starting the test:
   completing self-testing of the smart wristband automatically through the system software, wherein the self-testing comprises LED testing and sensor testing.

3. The testing method of claim 2, further comprising the following steps of:
   Setting the functions to correspond to a first flag bit before the test; and
   when the test passes, then setting the functions to correspond to a second flag bit, and generating test information according to the second flag bit and uploading the test information to the smartphone.

4. The testing method of claim 1, wherein the smart wristband is provided with a reset button, and the testing method further comprises the following step of:
   when the smart wristband runs out of power during the test, then charging the smart wristband and, meanwhile, long-pressing the reset button to put the Bluetooth function of the smart wristband into the sleep state again.

5. A testing method for a smart wristband, comprising the following steps of:
   presetting system software to put Bluetooth function of the smart wristband into a sleep state before test;
   electrically connecting the smart wristband when starting the test so that the Bluetooth function of the smart wristband is activated; and
   completing pairing connection between the smart wristband and a testing apparatus, and synchronously displaying functions of the smart wristband on a screen of the testing apparatus, wherein the testing apparatus is a smartphone, the testing of the functions comprises at least one of Bluetooth power testing, writing of mainboard serial number, charging testing and motor vibration controlling.

6. The testing method of claim 5, further comprising the following step before the step of electrically connecting the smart wristband when starting the test:
   completing self-testing of the smart wristband automatically through the system software, wherein the self-testing comprises LED testing and sensor testing.

7. The testing method of claim 5, wherein the writing of the mainboard serial number of the smart wristband is accomplished through scanning with a camera of the smartphone, and positions of the smartphone and the smart wristband relative to each other remain unchanged during the Bluetooth power testing.

8. The testing method of claim 5, wherein the step of electrically connecting the smart wristband when starting the test comprises the following step of:
   electrically connecting the smart wristband to the testing apparatus when starting the test, and electrically disconnecting the smart wristband from the testing apparatus after the Bluetooth function is activated.

9. The testing method of claim 8, wherein the smart wristband is provided with a reset button, and the testing method further comprises the following step of:
   when the smart wristband runs out of power during the test, then charging the smart wristband and, meanwhile, long-pressing the reset button to put the Bluetooth function of the smart wristband into the sleep state again.

10. A testing system for a smart wristband, comprising a shielding box as well as a positioning mechanism, power pins and a testing apparatus disposed within the shielding box, wherein:
    the positioning mechanism is adapted to fix the testing apparatus and the smart wristband to specified positions in the shielding box before test, Bluetooth function of the smart wristband is put into a sleep state through presetting system software, and the testing apparatus is a smartphone;

the power pins are adapted to electrically connect the smart wristband when starting the test so that the Bluetooth function of the smart wristband is activated to complete pairing connection between the smart wristband and the testing apparatus and functions of the smart wristband is synchronously displayed on a screen of the testing apparatus, wherein the testing of the functions comprises at least one of Bluetooth power testing, writing of mainboard serial number, charging testing and motor vibration controlling.

11. The testing system of claim 10, wherein the power pins are adapted to electrically connect the smart wristband to the testing apparatus when starting the test and electrically disconnect the smart wristband from the testing apparatus after the Bluetooth function is activated.

12. The testing system of claim 11, further comprising a loud speaker and an earphone jack, wherein the loud speaker is adapted to play a ringtone for prompting that the pairing connection has been completed, and the earphone jack is adapted to receive an earphone therein so that the prompting ringtone is played via the earphone to prompt that the pairing connection has been completed.

13. The testing system of claim 11, wherein the smart wristband is provided with a reset button, which is adapted to put the Bluetooth function of the smart wristband into the sleep state again through long-pressing of the reset button when the smart wristband runs out of power during the test and is being charged.

14. The testing method of claim 1, wherein whether the pairing connection between the smart wristband and the smartphone has been completed is determined by the following steps:

setting a third flag bit or a fourth flag bit in the smart wristband and the smartphone before the pairing connection; and when the pairing connection is completed, then setting the flag bits in the smart wristband and the smartphone to be the fourth flag bit; and when the pairing connection is not completed, then setting the flag bits in the smart wristband and the smartphone to be the third flag bit.

15. The testing method of claim 6, further comprising the following steps of:

setting the functions to correspond to a first flag bit before the test; and when the test passes, then setting the functions to correspond to a second flag bit, and generating test information according to the second flag bit and uploading the test information to the smartphone.

16. The testing method of claim 5, wherein whether the pairing connection between the smart wristband and the smartphone is completed is determined by the following steps:

setting a third flag bit or a fourth flag bit in the smart wristband and the smartphone before the pairing connection; and when the pairing connection is completed, then setting the flag bits in the smart wrist band and the smartphone to be the fourth flag bit; and when the pairing connection is not completed, then setting the flag bits in the smart wrist band and the smartphone to be the third flag bit.

17. The testing system of claim 10, wherein the smartphone obtains the testing information of the at least one of Bluetooth power testing, writing of the mainboard serial number, charging testing and motor vibration controlling to notify the user of the state of the smart wristband.

18. The testing method of claim 5, wherein the step of electrically connecting the smart wristband when starting the test comprises the following step of:

electrically connecting the smart wristband to a power sources except the testing apparatus when starting the test, and electrically disconnecting the smart wristband from the power sources after the Bluetooth function is activated.

19. The testing method of claim 5, wherein the smart wristband and the testing apparatus are fixed in a shielding box, in the shielding box, only the smart wristband and the testing apparatus have the Bluetooth function so that the smart wristband and the test apparatus are connected in one-to-one correspondence via Bluetooth during the test.

* * * * *